US008080212B2

(12) United States Patent
Speer et al.

(10) Patent No.: US 8,080,212 B2
(45) Date of Patent: Dec. 20, 2011

(54) METHOD AND APPARATUS FOR HIGH SPEED ACTIVATION OF OXYGEN SCAVENGING COMPOSITIONS

(75) Inventors: Drew Ve Speer, Simpsonville, SC (US); Paul D. Spence, Greenville, SC (US); Gregory E. McDonald, Simpsonville, SC (US); Timothy S. Dennison, Greer, SC (US); Gregory H. Grossman, Greenville, SC (US); Csaba F. Kiss, Simpsonville, SC (US); Jason G. Verrett, Simpsonville, SC (US); Charles C. Zende, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 12/870,273

(22) Filed: Aug. 27, 2010

(65) Prior Publication Data
US 2010/0320399 A1 Dec. 23, 2010

Related U.S. Application Data

(62) Division of application No. 11/007,821, filed on Dec. 8, 2004, now Pat. No. 7,807,111.

(60) Provisional application No. 60/573,616, filed on May 21, 2004.

(51) Int. Cl.
*B01J 19/08* (2006.01)

(52) U.S. Cl. ............... 422/186; 422/186.03; 422/186.05; 250/491.1; 250/492.2; 250/504 R; 252/188.28; 426/240

(58) Field of Classification Search ................ 422/186, 422/186.03, 186.05; 250/491.1, 492.2, 504 R; 252/188.28; 426/240
See application file for complete search history.

(56) References Cited

U.S. PATENT DOCUMENTS

| 4,121,107 | A | 10/1978 | Bachmann |
|---|---|---|---|
| 4,871,559 | A | 10/1989 | Dunn et al. |
| 4,959,044 | A | 9/1990 | Smith et al. |
| 5,211,875 | A | 5/1993 | Speer et al. |
| 5,280,818 | A | 1/1994 | Ubelhart |
| 5,350,622 | A | 9/1994 | Speer et al. |
| 5,399,289 | A | 3/1995 | Speer et al. |
| 5,498,364 | A | 3/1996 | Speer et al. |
| 5,788,940 | A | 8/1998 | Chichi et al. |

(Continued)

FOREIGN PATENT DOCUMENTS

EP     1 598 391     11/2005

(Continued)

OTHER PUBLICATIONS

Dunn et al., "Pulsed-Light Treatment of Food and Packaging," *Food Technology*, Sep. 1997, pp. 95-98.

(Continued)

*Primary Examiner* — Jeffrey T Barton
*Assistant Examiner* — Xiuyu Tai
(74) *Attorney, Agent, or Firm* — Alston & Bird LLP

(57) ABSTRACT

The invention is a method, triggering unit, and system for activating an oxygen scavenging composition at high speeds. The triggering unit includes a plurality of UV lamps that can operate at increased temperatures and have high output intensites from about 10 to 35 mW/cm². The triggering unit can activate films at speeds from about 20 to 100 fps. Mercury amalgam lamps are useful in the practice of the invention. The invention also includes a UV dose management system and film tensioning system that facilitates triggering at high film speeds. The UV dose management system controls the amount of UV exposure that the film receives so that the oxygen scavenging rate of the activated composition can be controlled.

19 Claims, 10 Drawing Sheets

U.S. PATENT DOCUMENTS

| | | | |
|---|---|---|---|
| 5,811,027 | A | 9/1998 | Speer et al. |
| 5,859,145 | A | 1/1999 | Ching et al. |
| 5,904,960 | A | 5/1999 | Becraft et al. |
| 5,911,910 | A | 6/1999 | Becraft et al. |
| 5,958,254 | A | 9/1999 | Rooney |
| 6,214,254 | B1 | 4/2001 | Gauthier et al. |
| 6,233,907 | B1 | 5/2001 | Cook, Jr. et al. |
| 6,255,248 | B1 | 7/2001 | Bansleben et al. |
| 6,259,107 | B1 | 7/2001 | Becraft et al. |
| 6,287,481 | B1 | 9/2001 | Luthra et al. |
| 6,449,923 | B1 | 9/2002 | Cook, Jr. et al. |
| 6,596,203 | B1 | 7/2003 | Au et al. |
| 6,599,487 | B1 | 7/2003 | Luthra et al. |
| 6,632,408 | B1 | 10/2003 | Luthra et al. |
| 6,720,566 | B2 | 4/2004 | Blandford |
| 6,758,255 | B2 | 7/2004 | Moreno et al. |
| 6,764,719 | B2 | 7/2004 | Russell et al. |
| 6,953,940 | B2 | 10/2005 | Leighley et al. |
| 2005/0258378 | A1 | 11/2005 | Speer et al. |

FOREIGN PATENT DOCUMENTS

| | | |
|---|---|---|
| JP | 62-109738 | 7/1987 |
| JP | 62-229833 | 10/1987 |
| JP | 1-52413 | 11/1989 |
| JP | 02-214570 | 8/1990 |
| JP | 2001-520947 | 5/1999 |
| JP | 2000-327191 | 11/2000 |
| JP | 2002-292825 | 10/2002 |
| WO | WO 95/02616 | 1/1995 |
| WO | WO 95/04776 | 2/1995 |
| WO | WO 98/05555 | 2/1998 |
| WO | WO 98/05703 | 2/1998 |
| WO | WO 98/17535 | 4/1998 |
| WO | WO 99/48963 | 9/1999 |
| WO | WO 03/010226 | 2/2003 |
| WO | WO 2004/035417 | 4/2004 |

OTHER PUBLICATIONS

European Search Report for 05252995.5 dated Aug. 24, 2005.

METHOD AND APPARATUS FOR HIGH SPEED ACTIVATION OF OXYGEN SCAVENGING COMPOSITIONS

CROSS-REFERENCE TO RELATED APPLICATIONS

This application is a divisional of U.S. application Ser. No. 11/007,821 filed Dec. 8, 2004 which claims the benefit of U.S. Provisional Application Ser. No. 60/573,616 filed May 21, 2004, the contents of which are hereby incorporated by reference U.S. patent application Ser. No. 11/007,821 is issued to U.S. Pat. No. 7,807,111.

BACKGROUND OF THE INVENTION

The invention relates generally to articles that are used in packaging oxygen sensitive materials, and more particularly to the triggering of an oxygen scavenging composition.

Reducing the exposure to oxygen of oxygen sensitive articles maintains and enhances the quality and shelf life of the article. For instance, reducing the oxygen exposure of oxygen sensitive food products in a packaging system maintains the quality of the food product and avoids food spoilage. Reduced oxygen exposure keeps the product in inventory longer, thereby reducing costs incurred from waste and having to restock.

One method of reducing oxygen exposure is to incorporate an oxygen scavenger into the packaging structure. Oxygen scavenging compositions are compositions that consume, deplete, or reduce the amount of oxygen in a given environment. There are a wide variety of different compositions that can be used in oxygen scavenging applications. Exemplary compositions are described in U.S. Pat. Nos. 5,211,875; 5,350,622; 5,399,289; and 5,811,027 to Speer et al. and WO 99/48963 to Cai et al. The oxygen scavenging composition can comprise a substituted or unsubstituted ethylenically unsaturated composition that is capable of scavenging oxygen upon activation or triggering. The oxygen scavenging composition can also include a metal catalyst and photoinitiators that help activate oxygen scavenging, and can be "triggered" by exposing the composition to a radiation source, such as actinic radiation, having sufficient power for a sufficient amount of time to initiate oxygen scavenging. High temperatures can also help trigger the oxygen scavenging composition.

Methods of triggering oxygen scavenging compositions typically use low-pressure mercury germicidal lamps that have an intensity output from about 5 to 10 mW/cm$^2$. These lamps are commonly referred to as germicidal since the principal emission is at 254 nm. During UV light exposure, the compositions can also be heated to further enhance triggering. Heating the composition makes it possible to trigger the oxygen scavenging composition at a lower UV dose.

Low-pressure mercury germicidal lamps have optimal performance at temperatures slightly above room temperature to slightly below room temperature. A disadvantage for triggering oxygen scavenging film that is associated with standard mercury germicidal lamps is their sensitivity to heat. As lamp temperature increases above room temperature the lamp output drops. As a result, a lamp that can be capable of an intensity of about 10 mW/cm$^2$ at room temperature may have an intensity that is about 4 to 6 mW/cm$^2$ at higher operating temperatures. As a practical limitation then, a balance must be struck between warming the film to facilitate triggering and the associated loss in lamp output.

The need to compensate for reduced lamp intensities at higher film temperatures results in a compromise between maximizing lamp intensity and the amount of heat that can be applied to the composition. Reduced lamp intensities can require the composition to be exposed to the lamps for a longer duration or require that a larger number of lamps be used. Although heating the film facilitates triggering, heating the film can also increase lamp temperatures, and thereby further lower intensities. At higher temperatures, a film can curl and become unusable. Current methods are typically limited to a temperature threshold that is below 50° C.

The compromise between lamp intensity and temperature can limit the speed at which the composition can be adequately triggered. Film triggering is limited to about 20 ft/min (fpm) with current methods when using as many as 80 (24 watt) germicidal lamps.

BRIEF SUMMARY OF THE INVENTION

The invention is a method, apparatus, and system of using the apparatus for triggering an oxygen scavenging composition. The invention uses UV lamps combined with improved film tensioning, UV dose management, and temperature regulation to provide an apparatus and method that can be used to trigger oxygen scavenging compositions at speeds in some cases exceeding 100 ft/min. Mercury amalgam lamps are useful in the practice of the invention. Mercury amalgam lamps produce higher lamp intensities and operate at higher temperature. Amalgam lamps have intensities that are from about 10 to 35 mW/cm$^2$ and can operate with surface temperatures ranging from 90° to 150° C. As a result, the present invention can activate oxygen scavenging compositions at higher speeds while sometimes using fewer lamps than are currently used.

The invention includes an improved triggering unit that comprises a plurality of low-pressure mercury amalgam lamp banks, a film shuttle system, and an air circulation system for regulating the temperature of the film and the temperature of the lamps. The film shuttle system includes a series of stationary rolls and moveable shuttle rolls that together define an adjustable length film path through the triggering unit and direct the film into close proximity with the lamp banks. The shuttle rolls are capable of being repositioned so that the amount of UV exposure the film receives can be controlled. As a result, the triggering unit can maintain the UV dose on the film within an optimal range across a wide range of packaging speeds. The shuttle system can also be used to apply tension to the film. Applying tension to the film helps prevent film curl that can be induced at higher operating temperatures.

In another aspect of the invention, the UV lamps can be disposed in a lamp cassette that comprises a housing having openings through which UV light can be transmitted. The lamp cassettes can include a shutter system to control film UV exposure. The shutter system includes shades that can be selectively opened or closed to cover the openings. The cassettes can also be connected to an air circulation system that introduces a cooling air flow over the lamps.

Thus, the invention provides, among other things, a method and apparatus for triggering oxygen scavenging compositions at high speeds. The invention uses a film tensioning, dose management, and temperature regulating systems that can improve activation, help prevent film damage, and prolong bulb life.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The invention is a method, apparatus, and system of using the apparatus for the high speed triggering of an oxygen scavenging composition. The invention includes an improved triggering unit whereby UV lamps having greater intensities and higher temperatures can be used to activate oxygen scavenging compositions. The triggering unit includes a film tensioning system and dose management system that facilitates film triggering at higher temperatures and increased operational speeds. The triggering unit can also include two separate air circulation systems that can be used to regulate and control the temperature of the film and the lamps.

Figure 1:
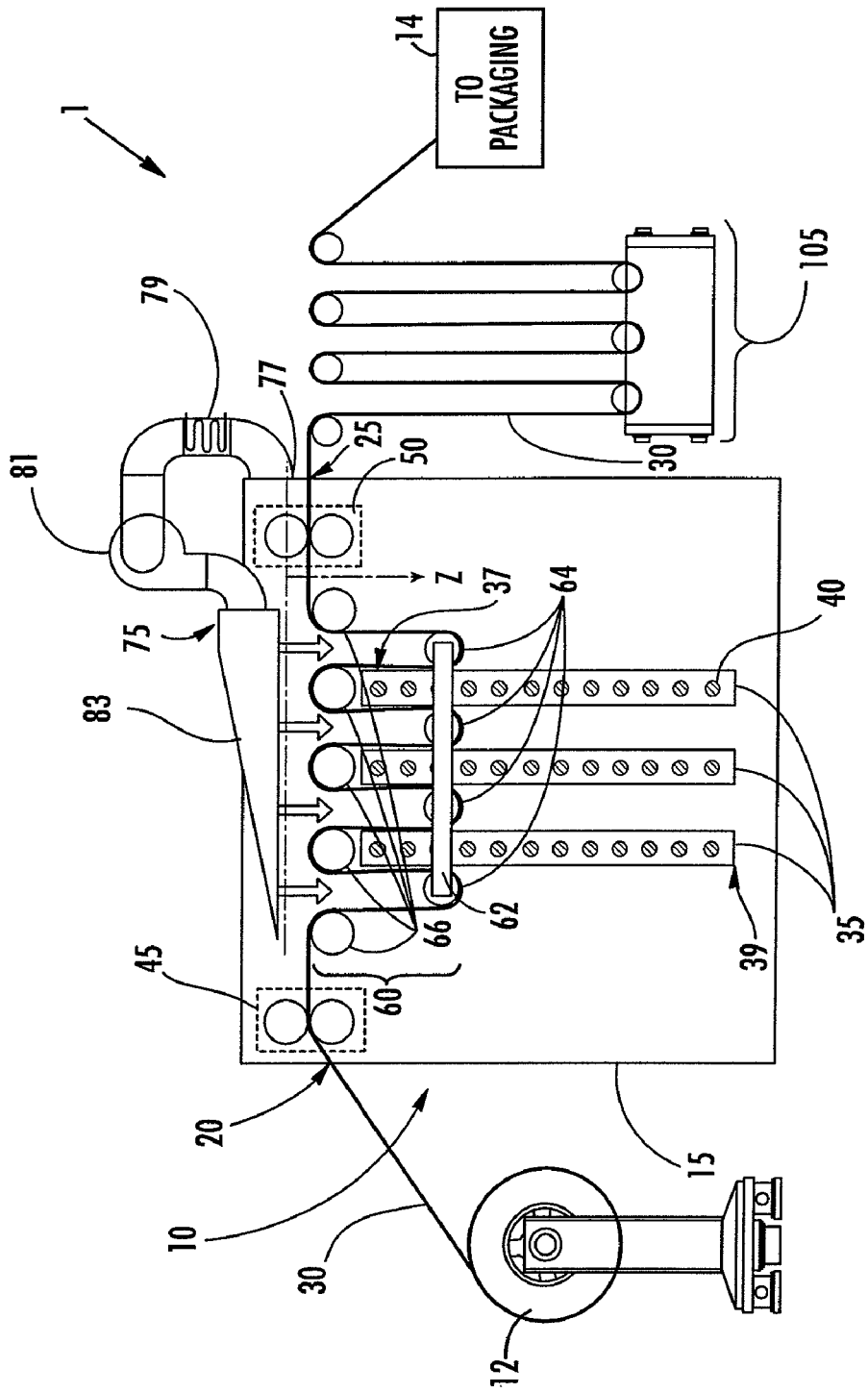
FIG. 1 is a schematic illustration of a triggering system and triggering unit that are in accordance with the invention.

With reference to FIG. 1, a triggering system that is in accordance with the invention is broadly designated with reference number 1. As shown in FIG. 1, the system includes a triggering unit shown generally at 10 for activating an oxygen scavenging composition, an inventory section 105 for temporarily accumulating activated film, and a packaging system 14 for packaging product or storage. In some embodiments the film 30 can be supplied from a continuous roll 12 of film. The film 30 enters the triggering unit 10 and is exposed to a UV light source of sufficient intensity and for a residence time sufficient to activate the oxygen scavenging composition. The activated film 30 then exits the triggering unit and travels through an inventory section 105. The capacity of the inventory section is expandable so that in the event of a production line stoppage, the inventory section can temporarily store any film that is contained within the triggering unit. After passing through the inventory section the film travels to a packaging device or wind-up roll where it can be stored for later use.

The triggering unit 10 includes at least one UV lamp bank 35, and a film tensioning system and dose management system. The film tensioning system and dose management system shown in FIG. 1 are both integrated into a single system (see reference number 60) that can be used to control the level of UV exposure and maintain adequate film tension. As a result, the system can accommodate a wide range of packaging speeds and be easily adapted for activating a wide variety of films, webs, articles, and the like that contain oxygen scavenging compositions.

Figure 5:
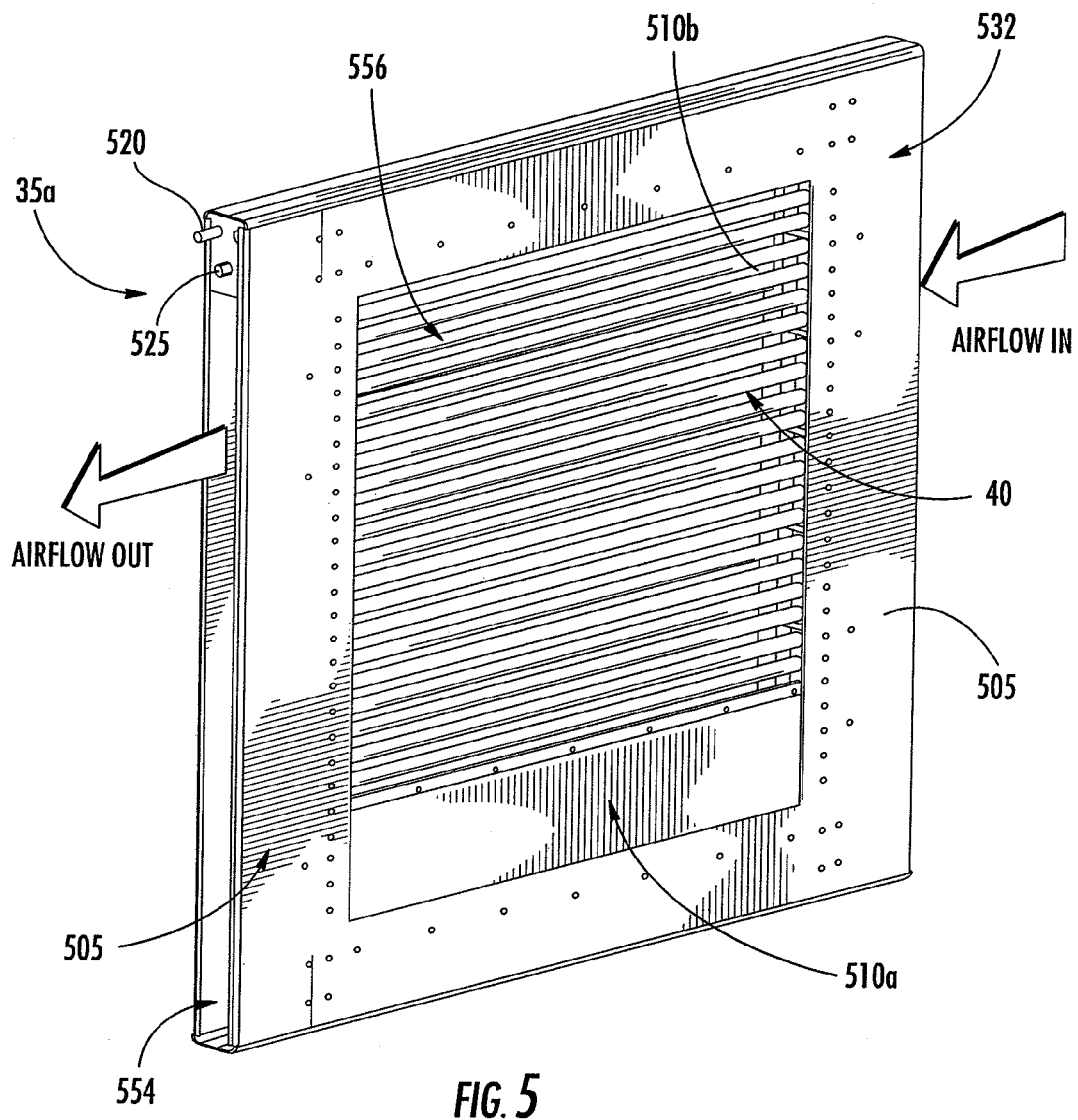
FIG. 5 is a graphical illustration of a UV lamp cassette that is in accordance with the invention.
Figure 6A:
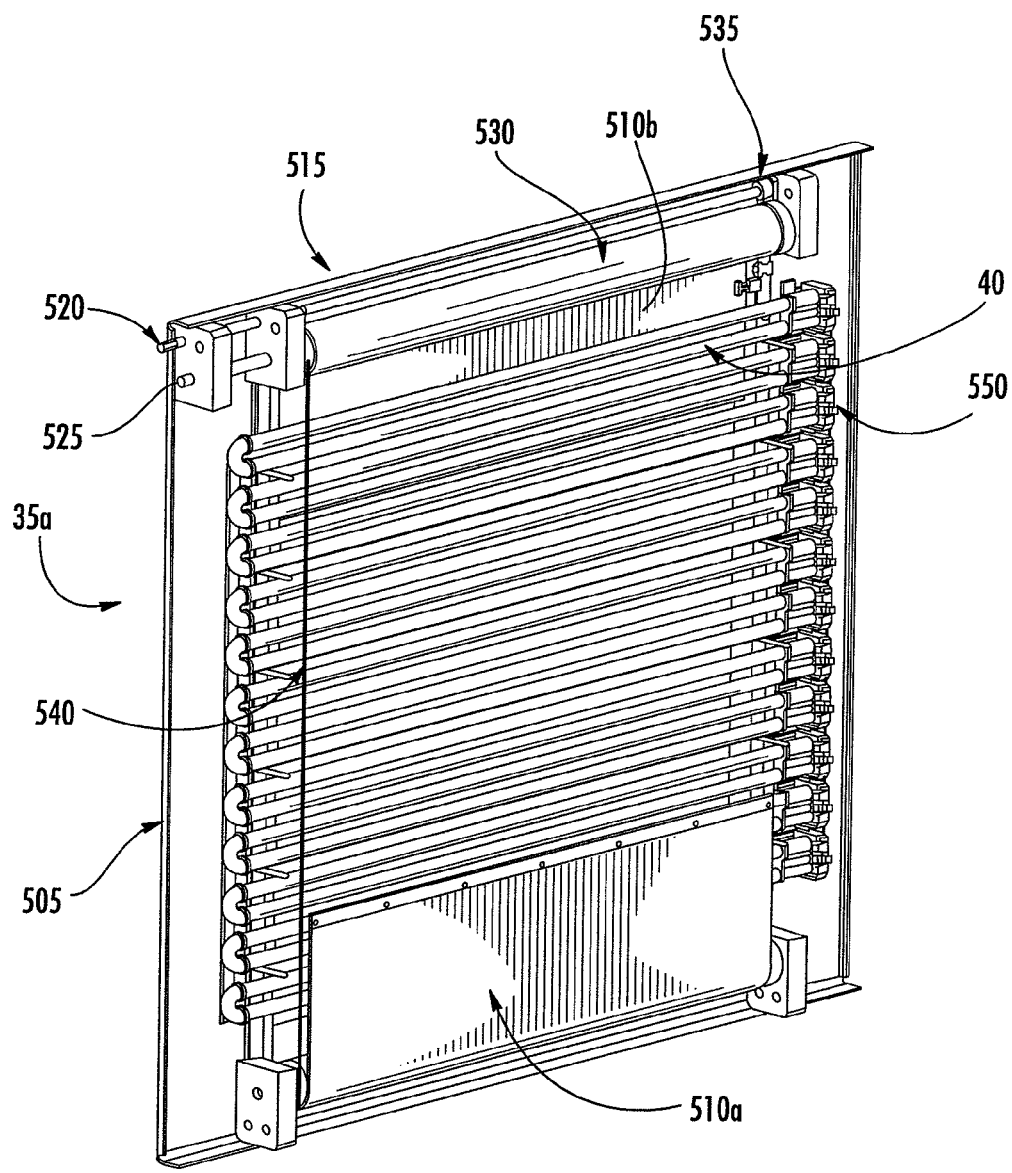
FIG. 6a is a graphical illustration of the inner mechanism of the UV cassette depicted in FIG. 5.
Figure 6B:
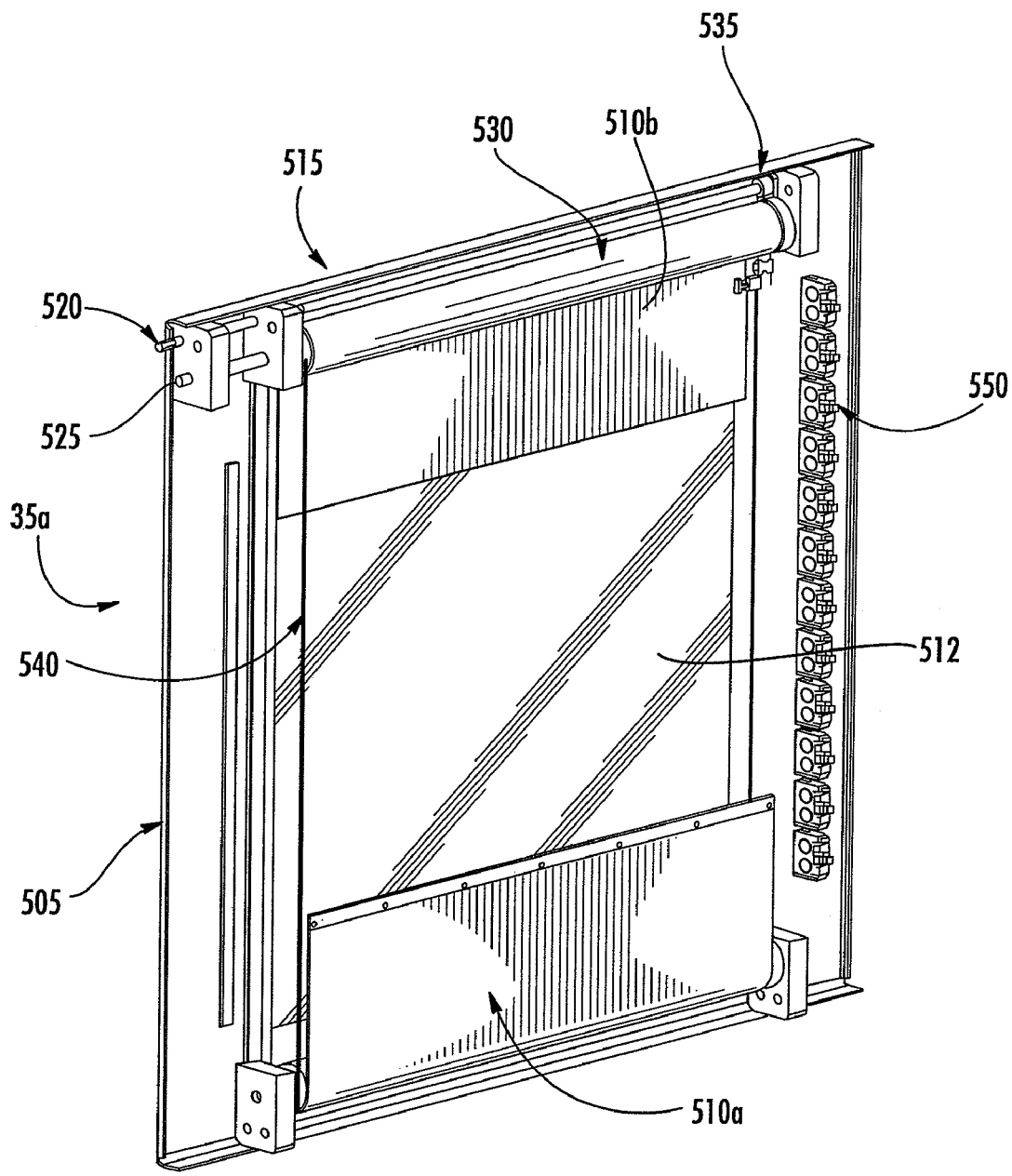
FIG. 6b is a graphical illustration of the cassette depicted in FIG. 6a wherein the lamps have been removed.

The triggering unit in some embodiments includes a plurality of UV lamp banks 35 that are evenly spaced and substantially parallel to each other. The lamp banks have a proximal end 37 and a distal end 39. Each UV lamp bank typically comprises a plurality of UV lamps that are substantially parallel to each other and can be arranged in a side-by-side manner to allow optimal exposure to the film. The lamp bank in some embodiments has from about 5 to 15 UV lamps. The lamp bank can have a wide variety of structures and forms. In one embodiment, the lamp bank can be in the form of an enclosed cassette having a pair of dual windows through which UV light can be transmitted. A form of this embodiment is illustrated in FIGS. 5 and 6, which is discussed in greater detail below. The lamp banks can also include a protective UV transparent window pane (see FIG. 6b, reference number 512) or sleeve (not shown) that can protect the film from debris in the event of lamp breakage. The window pane typically comprises quartz or a thin sheet of a fluorocarbon polymer such as FEP-Teflon® that is from about 1 to 7 mils thick. The sleeve can be a shrinkable member or coating that can be applied to the lamps. One type of sleeve comprises FEP-Teflon® that can be heat shrunk around each lamp.

Lamps that are useful in the invention have output intensities at 254 nm that are typically from about 10 to 35 $mW/cm^2$ measured at 2 inches and at air temperatures that can reach up to about 75° C. Somewhat more typical is intensity from about 15 to 35 $mW/cm^2$. UV-C light such as UV light of germicidal wavelengths has been found particularly effective at triggering certain oxygen scavenging compositions. Particularly useful wavelengths are between 200 nm and 280 nm, such as 254 nm. The lamps should be able to produce high output intensities at elevated air temperatures. Mercury amalgam lamps are useful in the practice of the invention. Mercury amalgam lamps can have intensities that can be greater than 3 times the output of standard mercury lamps. Low-pressure mercury amalgam lamps are germicidal lamps that produce their highest output at wavelengths that are between 200 to 280 nm. Within this region the lamps can produce intensities that exceed 20 $mW/cm^2$. Typically, the amalgam lamps have intensities at 254 nm that are from about 15 to 35 $mW/cm^2$.

Mercury amalgam lamps also produce heat resulting in lamp surface temperatures that can exceed 50° C. These increased operating temperatures do not typically affect lamp output because amalgam mercury lamps produce their maximum intensities at lamp temperatures that are between 100 to 120° C. Amalgam lamps contain a mercury amalgam that lowers the vapor pressure of mercury and thereby acts like an internal "cooler." Lowering the vapor pressure of the mercury allows the lamps to continue to operate at high temperatures without sacrificing lamp output. As a result, temperatures within the triggering unit can exceed 75° C. The radiant heat produced by the lamps may also be used to efficiently heat the film. The combination of higher film temperature and greater lamp intensity means that the composition requires significantly less exposure time, and thereby can be triggered at higher speeds. Typical film speeds are from about 20 to 120 fpm or from about 40 to 100 fpm. Films speeds from about 50 to 80 fpm or 60 to 80 fpm are somewhat more typical of a unit like that shown in FIG. 1.

As shown in FIG. 1, the triggering unit 10 can include a triggering chamber 15 in which the UV lamp banks 35 are disposed. Typically, film tension can be maintained using a first driven roll 45 and a second driven roll 50 in combination with a shuttle system 60. Selectively adjusting the speed of driven rolls 45, 50 can be used to maintain a desired level of tension on the film as it enters and exits the chamber 15. Any slack or reduction in film tension that occurs within the chamber between rolls 45 and 50 can be absorbed by the shuttle system 60 that can apply tensioning force to the film. Maintaining the film at a desired level of tension within the triggering unit helps reduce or eliminate film curl that can occur at higher temperatures. The film should be maintained at a tension that is sufficient to maintain web control and overcome the tendency of the web to curl at higher temperatures. Typically, web or film tension in the chamber is maintained from about 0 to 2.5 pounds per linear inch of web width (PLI). Somewhat more typical, is a tension that is slightly greater than 0 PLI and that is less than 2.5 PLI, for example 0.5 to 1.0 PLI. Excessive tension could result in elongation of the film accompanied by a decrease in the width of the film.

The first driven roll 45 will in some embodiments drive the film forward into the chamber 15 through inlet 20. The second driven roll 50 drives the film out of the chamber through an outlet 25. The speed of driven rolls 45 and 50 can be adjusted to increase or decrease film tension. The driven rolls can be selected from a wide variety of rolls, such as nip rolls, that can be used to drive the film in a desired direction. The driven rolls can be powered with a motorized device, such as an electric or pneumatic motor. The inlet and outlet define openings or slits in the chamber through which the film can enter or exit the chamber. In some embodiments, the triggering unit may include UV deflectors (not shown) disposed adjacent to the inlet and outlet. The UV deflector helps prevent stray UV light from exiting the triggering chamber. The driven rolls 45, 50 can be disposed within the chamber adjacent to the inlet and outlet. It should be recognized that the exact placement of the rolls 45, 50 is not critical to the practice of the invention and that the rolls may be placed at other locations within the chamber or outside of the chamber provided that the driven rolls can maintain a desired level of tension and forward motion on the film. The driven rolls can be used in conjunction with the shuttle system 60 to maintain a desired level of tension on the film.

Upon entering the chamber, the path of the film is directed and defined by the shuttle system. The shuttle system 60 comprises a plurality of stationary guide rolls 66, a shuttle frame 62, and shuttle rolls 64. The guide rolls 66 are in some embodiments disposed adjacent to the proximal end 37 of the lamp banks. The guide rolls can be substantially aligned with the lamp banks. The shuttle rolls 64 are in some embodiments disposed on, and supported by, the shuttle frame 62. Each lamp bank 35 is typically disposed between a pair of shuttle rolls 64. Driven roll 45 drives the film forward into the chamber. The film then passes over a series of guide rolls 66 and shuttle rolls 64. The guide rolls 66 support the film and cooperate with the shuttle rolls 64 to direct the path of the film into close proximity with each of the lamp banks 35. In this regard, FIG. 1 shows the film passing in close proximity to the lamp bank as it travels between each guide roll and each shuttle roll. The distance between the film and the lamps is can be from about 1 to 5 cm, e.g., about 2 cm.

In one embodiment of the invention, the film supports the shuttle frame as the film travels over the guide rolls 66 and about the shuttle rolls 64. In turn, the shuttle frame exerts a downward force on the film, and thereby maintains tension on the film as it travels through the triggering chamber. In this embodiment, movement of the shuttle frame is typically restrained to travel that is parallel to the lamp banks. FIG. 1 shows an arrow in the Z direction representing the axis along which the shuttle frame can travel. The shuttle system can also include a control system that can monitor and control the travel of the shuttle frame.

Figure 3A:
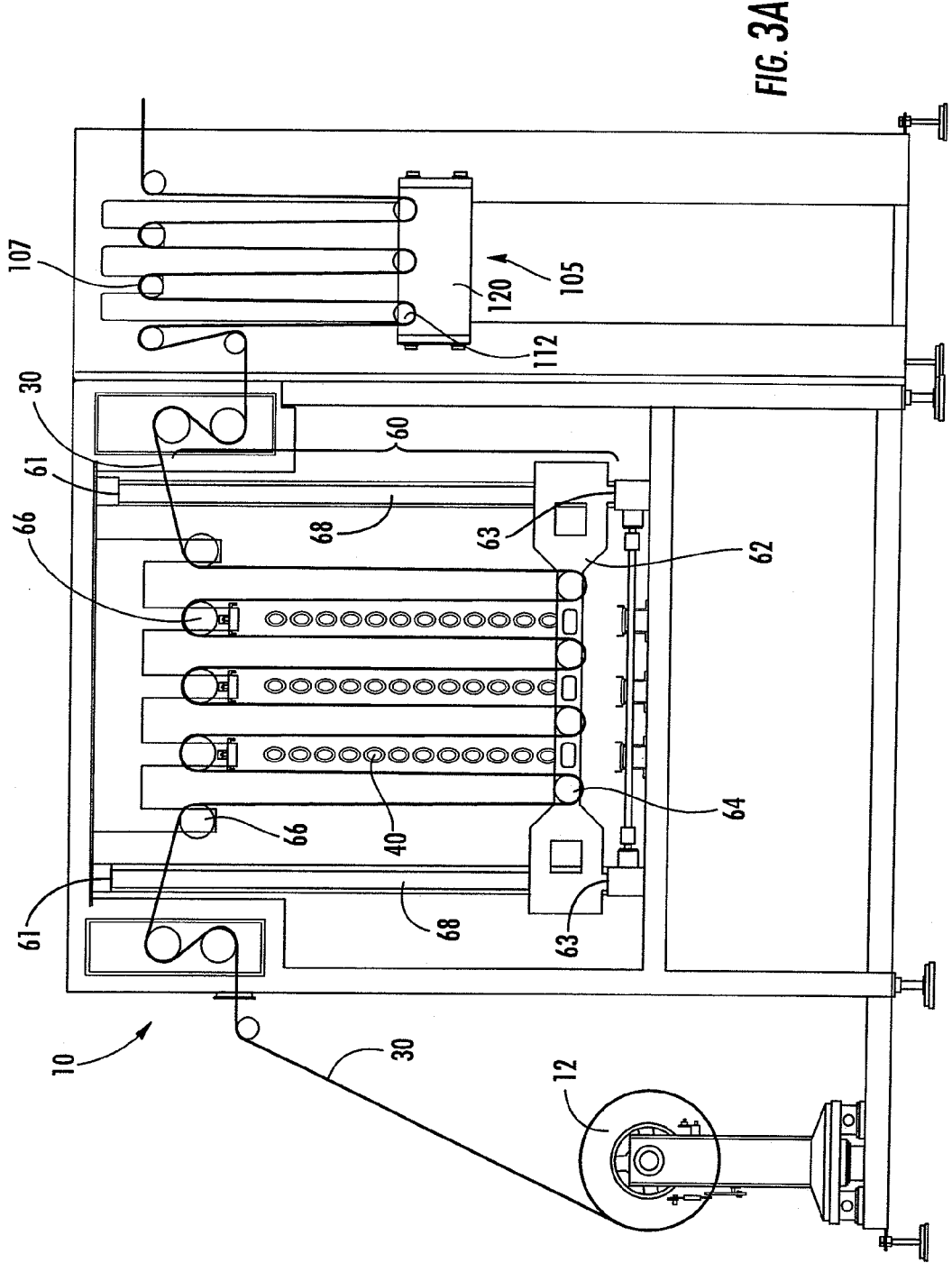
FIG. 3a is a schematic illustration of a triggering unit having a shuttle system that is in accordance with the invention.
Figure 3B:
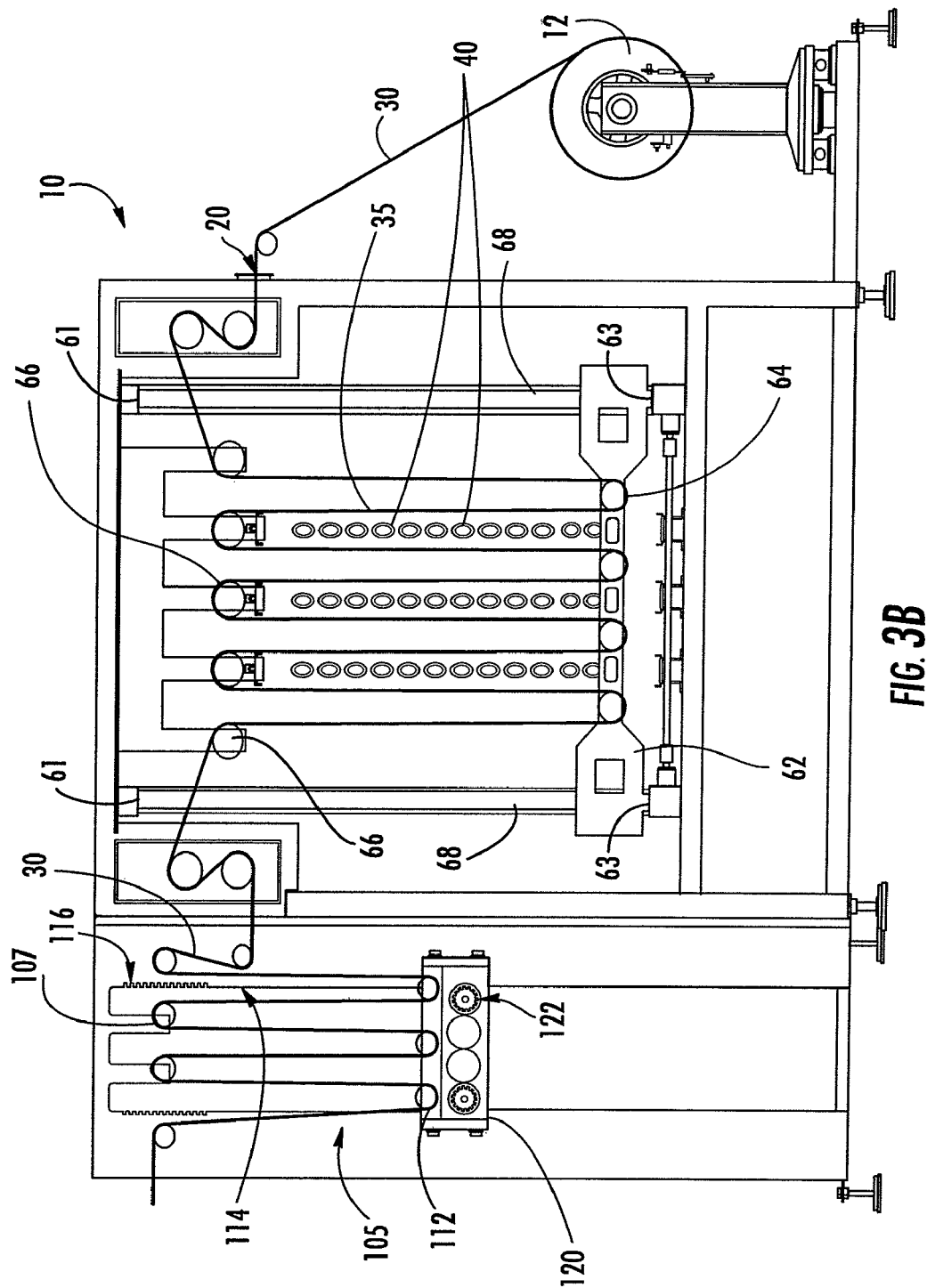
FIG. 3b is a schematic illustration depicting a triggering unit and inventory section that are in accordance with the invention.

An exemplary shuttle system 60 is illustrated in FIGS. 3A and 3B. The shuttle frame 62 can travel along "rod-less" air pistons or air cylinders 68 that can reposition the shuttle frame and can increase or decrease film tension. The shuttle system 60 can have a plurality of air pistons 68. Typically, the shuttle system includes 4 air pistons. Pressurized air can enter the air pistons from above or below the shuttle frame. Tension on the shuttle frame can be reduced to near zero by delivering pressurized air at the base 63 of the air pistons. Tension can be increased by delivering pressurized air into the apex 61 of the air pistons. The pressurized air can be used to exert a force on the shuttle frame to increase or decrease tension on the film. The air pistons can also be used to reposition the shuttle frame.

Alternatively, travel and positioning of the shuttle frame can be controlled by a pneumatic cylinder or motor. In this embodiment, tension can be maintained by using a monitoring system that sends and receives signals to and from a control unit, such as a programmable logic controller (PLC). The control unit can be programmed or automated to maintain a desired level of tension by directing the motor to reposition the shuttle frame.

It should also be recognized that the orientation of the lamp banks and shuttle system are not limited to the z-axis, and the shuttle system and lamp banks can have alternative arrangements, including any suitable physical orientation, provided that the film is directed in close proximity with the lamp banks and that a desired level of film tension can be maintained. For example, the lamp banks 35 and shuttle system could be rotated about 90° so that the lamp banks are stacked one on top of the other and are perpendicular to the z-axis. The shuttle frame would then be limited to movement in the horizontal plane. In this embodiment, a motorized device such as a pneumatic or electric motor could be used to control movement of the shuttle frame. Any physical orientation of the lamp banks 35 and shuttle system 60 in between or intermediate the vertical and horizontal embodiments can alternatively be employed in accordance with the invention.

The shuttle system in conjunction with a PLC can also function as a UV dose management system. It has been found that exposing oxygen scavenging compositions to different doses of UV-C light can affect the scavenging rate of the film after triggering. It is possible to under or over expose the film leading to poor scavenging and/or issues with regulatory compliance. As such, the triggering unit can be advantageously used to control the amount of UV exposure the composition receives, across a range of packaging speeds and thereby control the scavenging rate of the activated article. Current methods and equipment rely on turning off the lamps to prevent overexposure of the film; however, increased on/off cycles result in significantly shorter lamp life. It is therefore desirable to have a dose management system that does not require additional on/off cycles for the lamps.

As described above, the shuttle system can interchangeably go from a relatively fixed position to a moveable position and vice versa. In the moveable position, the shuttle system can travel between the distal end 39 and the proximal end 37 of the UV lamp banks. As a result, the shuttle system can change positions so that the amount of UV exposure that the film receives can be varied. This feature is particularly useful for activating oxygen scavenging films across a range of packaging speeds, including conditions where the packaging speed may routinely vary or be somewhat intermittent. For example, it is common for an operator to start up a packaging line at a low speed until all parameters are operating correctly and then ramp up to higher speeds. Under these conditions a constant UV dose and consistent oxygen scavenging can be maintained with the apparatus of the invention. In addition, a wide variety of films having differing oxygen scavenging compositions, or a given film intended for differing end use applications can be activated by the unit. For instance, if a lower scavenging rate is desired, the shuttle frame can be repositioned to be closer to the proximal ends 37 of the UV lamp banks (see shuttle frame position in FIG. 1). If a faster scavenging rate is desired, the shuttle frame can be repositioned closer to the distal ends of the lamp banks (see shuttle frame position in FIG. 3). Thus, the shuttle system can also be used to control the amount of UV exposure that the film receives.

The shuttle frame can also be repositioned so that UV exposure is substantially eliminated. For instance, the shuttle frame could be repositioned so that the shuttle frame is adjacent to the guide rolls. As a result, the film can travel between driven roll 45 to driven roll 50 without UV exposure. Thus, UV exposure can be eliminated or substantially prevented without having to turn off the lamps. This can be particularly useful when using mercury amalgam lamps. Typically, amalgam lamps have a longer warm up time than standard lamps from a cold start, and are even more detrimentally affected by on/off cycles than standard germicidal lamps.

Movement of the shuttle system can be accomplished in a wide variety of ways. As shown in FIG. 1, the driven nip rolls 45, 50 can be used to reposition the shuttle position by changing the speed on one of the driven rolls, relative to the speed of the other roll. For instance, the speed of first driven roll could be increased while the speed of second driven roll remains constant, resulting in a greater amount of the film being driven into the chamber than the amount of film being driven out of the chamber. This would cause film tension within the chamber to decrease because of the excess slack in the film. As a result, the weight of the shuttle frame would cause the frame to travel downwardly in the direction of the distal ends 39, thus exposing the film to a greater UV exposure. In the same manner, the speed of the second driven roller 50 can be increased so that the amount of UV exposure is decreased. When a desired amount of UV exposure is reached, the speed of the driven rollers can be readjusted so that the speed of the film as it enters and exits the chamber is substantially the same. Thus, the invention can be used to actively control and change the amount of UV exposure the film receives.

Figure 2:
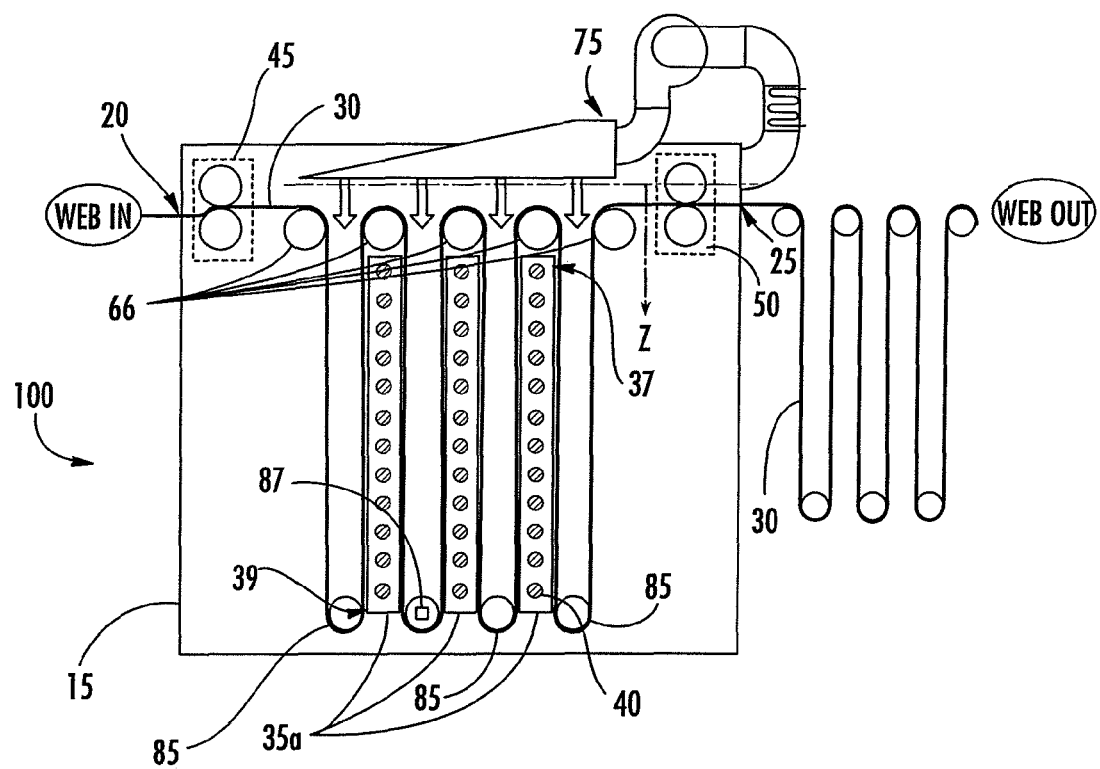
FIG. 2 is a schematic illustration of a triggering unit that is in accordance with the invention.

The triggering unit can also contain two separate air handling systems. Mercury amalgam lamps produce both UV-C light and heat. The infrared energy from the lamps can be used to heat the film to temperatures that can range from about 35 to 75° C. The film can be heated to temperatures that are greater than 50° C., e.g., from about 60 to 75° C. An air circulation system can be used to help prevent the film from exceeding desired temperatures. FIG. 1 illustrates an air handling system 75 for regulating the temperature of the film. The air handling system is typically an air circulation system that can be used to keep the film and the lamps at a desired temperature. FIGS. 1 and 2 illustrate an air circulation system 75. The air circulation system 75 typically includes an air intake 77, a heat exchanger 79, a fan or blower 81, and a plenum 83. The fan or blower 81 draws heated air from within the triggering chamber 15. The heated air is drawn into the intake 77 where it subsequently passed through a heat exchanger 79. The heat exchanger 79 can be used to cool the air. The heat exchanger may be air or water cooled. The air is then directed by fan 81 through a plenum 83 that directs the now cooled air into contact with the film 30. As a result, the temperature of the film 30 can be maintained at a desired temperature so that triggering is enhanced without damaging or curling the film. The chamber can be operated at a slight negative pressure. Although not illustrated, a vent could be located within the air circulation system 75 that could be used to vent some of the air outside the chamber. The triggering unit could also include an optional infrared heater (not shown) to heat the film before it enters the UV chamber.

Figure 4:
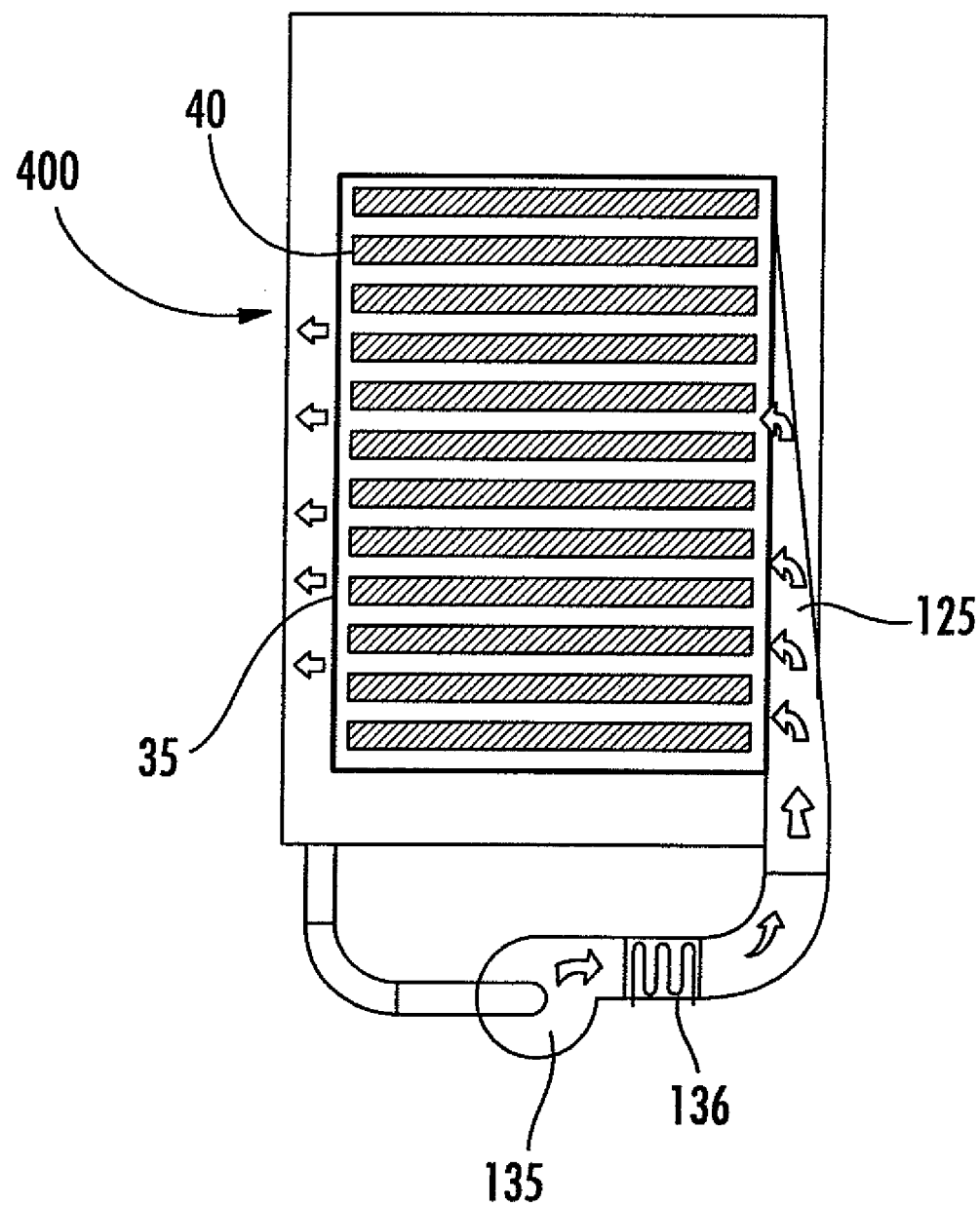
FIG. 4 is a graphical illustration of an air circulation system for cooling the lamps that is in accordance with the invention.

A second air handling system can be also used to help maintain lamp temperatures within a desired range. As stated above, the amalgam lamps have their greatest output at lamp temperatures that are from about 100 to 120° C. The lamp air circulation system is similar to the system for regulating the temperature of the film except that it directs cooling air into contact with the lamps. In this regard, FIG. 4 illustrates a lamp air circulation system 400 that can be used to cool the lamps 40. The lamp air circulation system comprises a fan or blower 135, a heat exchanger 136, and a plenum 125. Heated air can be removed from within the triggering chamber by fan 135 and directed into a heat exchanger 136. At the heat exchanger, the air is cooled and then directed into the plenum 125 where it is subsequently directed into contact with the lamps 40. The arrows represent airflow through the system.

In an alternative embodiment illustrated in FIG. 2, the triggering unit 100 includes a dose management system that is incorporated into the UV lamp banks 35*a*. In this embodiment, the triggering unit does not include a shuttle system for managing UV dose exposure and film tensioning. As shown in FIG. 2, the triggering unit 100 can include a triggering chamber 15. Similar to the embodiment described above, the chamber can include an inlet 20 and an outlet 25. The film is driven forward into the chamber 15 with a first driven roll 45, and is driven outwardly from the chamber with a second driven roll 50. Tension is maintained on the film by using a combination of upper stationary guide rolls 66, lower stationary guide rolls 85, and driven rolls 45, 50. The film 30 is driven into the chamber and directed in close proximity to UV lamp banks 35*a* using guide rolls 66, 85. A device for measuring film tension, such as a load cell, can be disposed on a stationary guide roll 66, 85. The load cell 87 can be in communication with or send periodic signals to a control unit (PLC) or operator indicating film tension. Increasing or decreasing the speeds of driven rolls 45, 50, can be used to adjust film tension.

The dose management system in FIG. 2 is accomplished by using a shutter system that is built into the UV lamp bank. FIGS. 5 and 6 illustrate a UV lamp bank that is in the form of a cassette 35*a*. As shown in FIG. 5, the UV cassette 35*a* comprises a cassette housing 505 having a plurality of mercury amalgam lamps 40 located therein. The cassette housing can comprise a first panel 532 and second panel 554, which together form an enclosed spaced in which the lamps are disposed. Typically, both panels 532, 554 have a central opening or window 556 exposing the lamps. Light generated by the lamps can pass through the openings. The central openings 556 can be covered with a thin pane 512 (see FIG. 6B) through which UV light can be transmitted. The pane serves dual functions. It encloses the lamps so that in the event of breakage, production contamination is limited, i.e., shattered quartz is prevented from contacting the film, and it encloses the cassette so that a controlled airflow can be introduced across the lamps with the air circulation system (see FIG. 4). Suitable materials for the pane should be able to transmit UV-C light and withstand the high temperatures that are produced by the lamps. Suitable materials include, but are not limited to fluorocarbon polymers such as FEP-TEFLON® and quartz glass. Typically, the FEP-TEFLON® pane is from about 1 to 7 mils in thickness, e.g., having a thickness of about 5 mils.

The dose management system can be incorporated into the cassette and act as a double-sided window shade. The shade can be lowered or raised to control the amount of UV exposure. In this regard FIGS. 5, 6a, and 6b illustrate the cassette having front and back shades 510a and 510b, respectively, to cover and enclose the UV lamps. The shades can be constructed of a variety of materials that are UV opaque and substantially prevent UV light from being transmitted from the lamps through the openings 556. The shades will in some embodiments be constructed of a thin flexible material such as a foil. Suitable materials include, but are not limited to, stainless steel, aluminum, metallic alloys, UV opaque plastic films, metalized plastic films, KAPTON®, and the like. In one form of the invention, the dual-shades can be closed and opened simultaneously. FIGS. 6a and 6b illustrate an exploded perspective of the cassette in which one of the panels has been removed. As shown in FIG. 6b, the cassette can comprise a front shade 510a and a back shade 510b. One of the shades can contain a winding mechanism 515 whereby the shade can be opened or closed by operation of a motor or other mechanism. FIGS. 6a and 6b depict a winding mechanism 515 that can be used to operate both the front and back shade. The winding mechanism can include a winding shaft that is in communication with a gear drive 535. The shade can be opened or closed by rotation of the winding shaft 520. The shade can be disposed on a roll 530 that can be under spring tension so that when released, the shade can automatically recoil, thereby opening the shade and exposing the UV lamps. A common winding mechanism 515 can be used to open or close both the upper and lower shades simultaneously. A pull chain or cable 540 can connect the recoil roll 530 to the front shade 510a so that as the back shade is opened or closed, the lower shade will likewise be opened or closed. The winding mechanism can also include a wind-up shaft 525 that is connected to the recoil roll 530. The wind-up shaft can be actuated to wind the shade onto the roll and thereby open the shade. The winding mechanism and wind-up shaft can be manually or automatically adjusted to provide a desired level of UV exposure. It should be understood that the cassette is not limited to the use of shades to control UV exposure and that other methods could be used. The dose management system in conjunction with a PLC can provide a consistent UV dose to the film across a wide range of packaging speeds, and can eliminate the need to switch the lamps off to prevent overexposure.

FIG. 6a also illustrates that the UV lamps 40 can be arranged substantially parallel to each other and oriented in a side-by-side manner. The UV lamps can be connected to a plurality of sockets 550 through which energy for powering the lights can be transmitted. The lamps can be in the form of a plurality of linear or U-shaped UV lamps. It should be understood that mercury amalgam lamps can have a variety of different shapes, and that the invention is not limited to any particular lamp shape or form.

Figure 7:
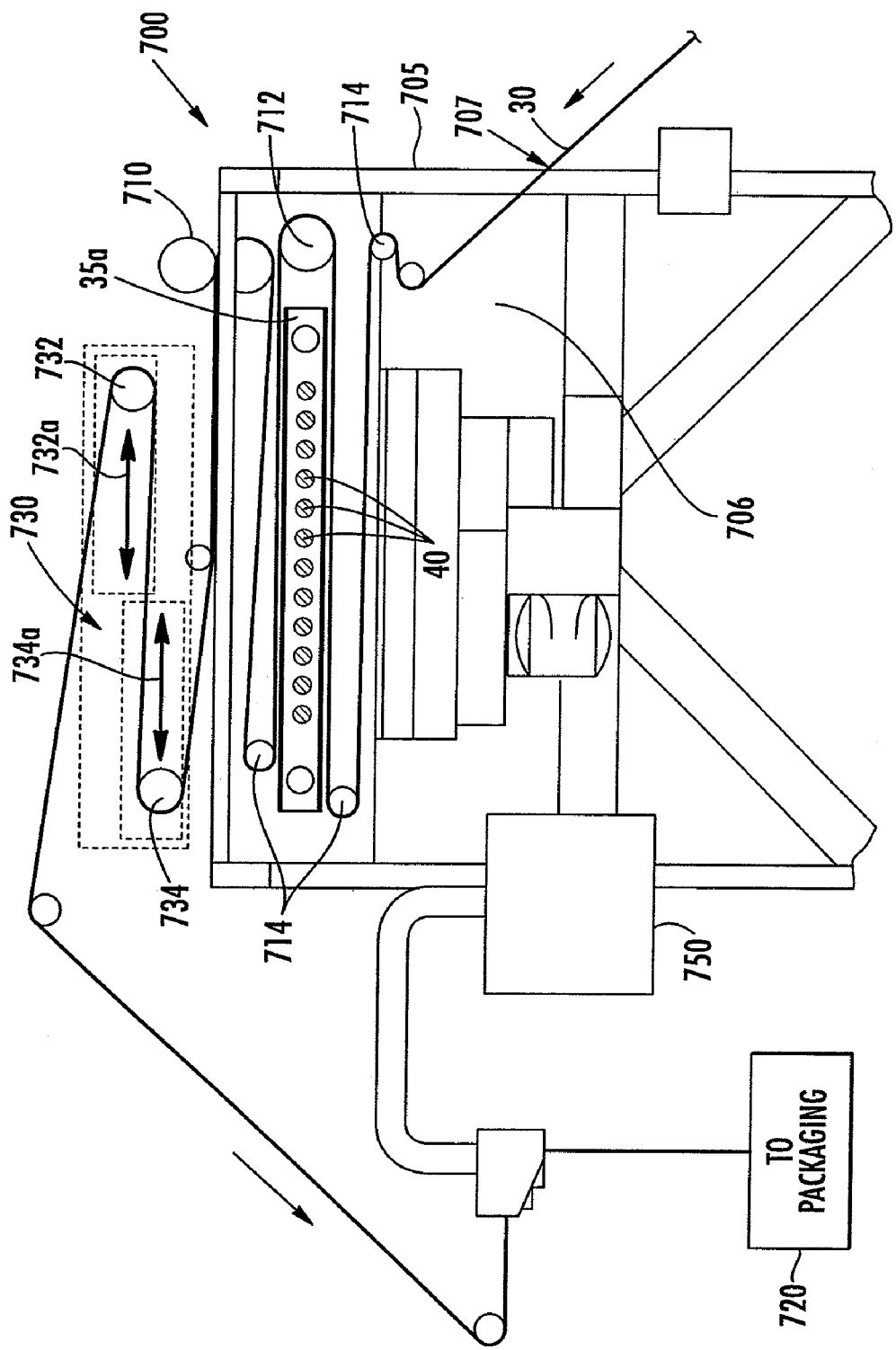
FIG. 7 is a graphical illustration of a front view of a triggering unit having a bank of UV lamps that are in a horizontal orientation relative to the triggering unit.
Figure 8:
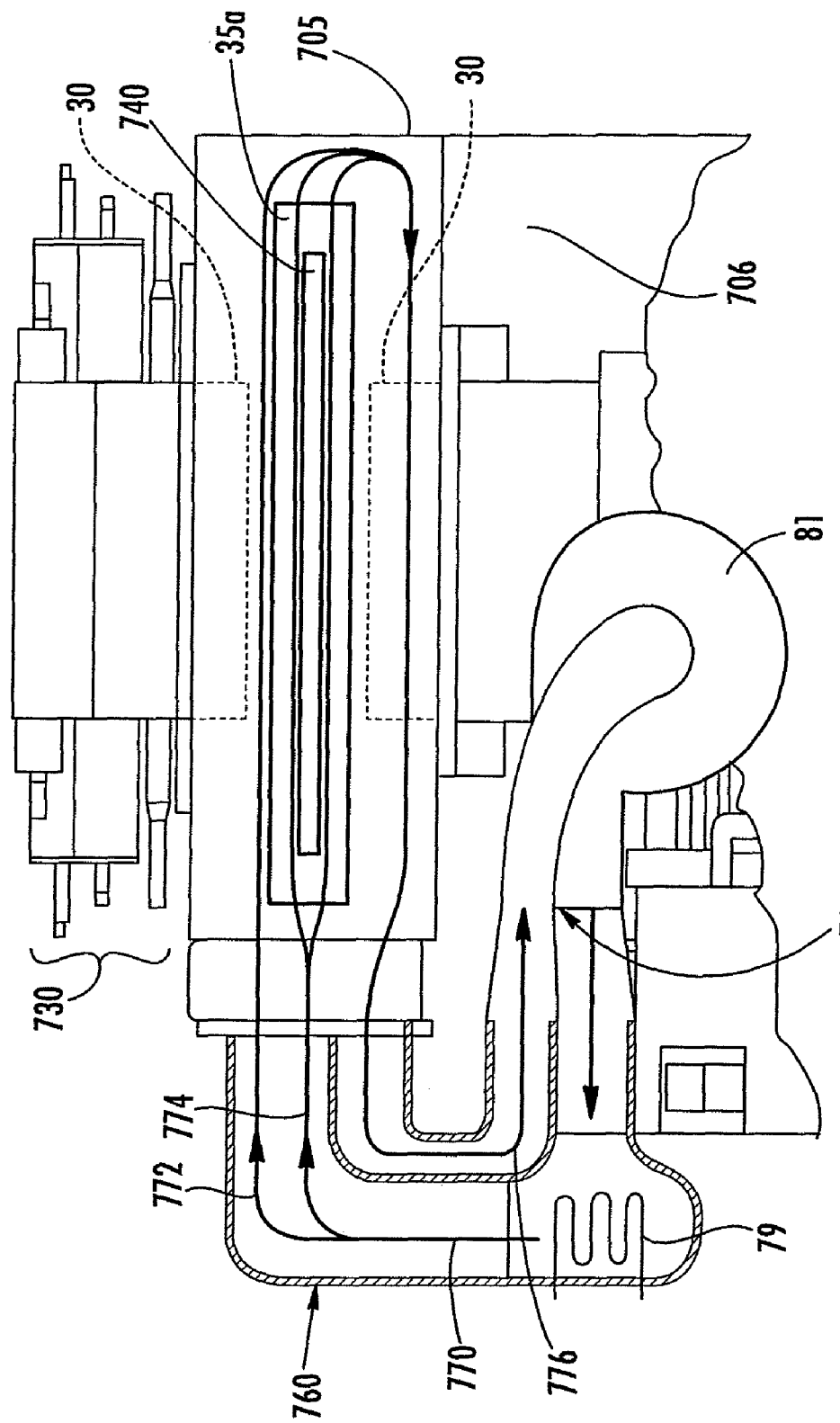
FIG. 8 is a cross-section view of the triggering unit depicted in FIG. 7 having an air circulation system.

In another embodiment, the triggering unit includes at least one lamp cassette that is oriented in a substantially horizontal arrangement. In this regard, FIGS. 7 and 8 illustrate a triggering system 700 having a triggering unit 705 with a lamp cassette 35a in a substantially horizontal orientation. As shown, film 30 enters the triggering chamber 706 at inlet 707. The film then passes over a series of rollers 714 and 712 that direct the film in a path that is in close proximity to the UV lamp bank. Tension on the web may be controlled with a first driven roll 710. In some embodiments, roll 712 may also be driven and work in cooperation with driven roll 710 to control the speed and tension of the film. In some embodiments the film will exit the chamber at an outlet (not illustrated) that may be positioned in close proximity to driven roll 710. Film tension can be maintained by selectively adjusting the speed of the driven rolls. As discussed above, each cassette 35a may contain shades that can limit and control the amount of UV light that is transmittable from within the cassette.

In some embodiments the triggering unit 705 may also include a control unit 750, such as a programmable logic controller. Control unit 750 can be used to operatively control film tension, film speed, UV dosage, temperature, and the like. Typically, the control unit may be in communication with driven rolls 710, 712, lamp cassette 35a, an air circulation system, and various sensors disposed within the triggering unit. The control unit can be used to monitor and control film tension and UV dosage.

Triggering system 700 may also include a film inventory section 730. The film inventory section typically includes a support structure (represented by the dashed line) and a plurality of rolls 732, 734 that can be slidably repositioned within slots 732a, 734a, respectively. Rolls 732, 734 may be repositioned to absorb or release excess inventory by moving within the slots. The inventory section 730 may be particularly useful when supplying film to a packaging machine having intermittent motion. Such packaging machines may employ an open tray or formed web that is stepped incrementally in conjunction with a loading cycle. For example, the invention can be used in conjunction with horizontal thermoforming lidding machines made by Multivac Inc., and Tiromat, and tray lidding machines made by Ross Industries, Inc., and G. Mondini S.p.A. The tray or package is subsequently sealed closed, often using a top web that may comprise an oxygen scavenging composition. After exiting the inventory section 730, the film can proceed to a packaging device 720.

As shown in FIG. 8, the triggering unit 705 in some embodiments may also include an air circulation system 760. The air circulation system 760 typically includes an air intake 761, a heat exchanger 79, a fan or blower 81, and a plenum (not illustrated). The fan or blower 81 draws heated air from within the triggering chamber 706. The heated air is drawn into the intake 761 where it subsequently passes through a heat exchanger 79. The heat exchanger 79 can be used to cool the air. The heat exchanger may be air or water cooled. The now cooled air 770 is split into two separate pathways, with air pathway 772 being directed into contact with the film 30, and air pathway 774 being directed through lamp cassette 35a to maintain the lamps at a desired temperature. Arrows 770, 776 represent air flow through the triggering chamber. In some embodiments the chamber can be operated at a slight negative pressure. Although not illustrated, a vent could be located within the air circulation system 760 that could be used to vent some of the air outside the chamber.

With reference to FIGS. 1 through 3, the triggering system 10 may also include a film inventory section that can be used to temporarily store any film contained in the shuttle system. The capacity of the inventory section should be as great as or greater than the capacity of the shuttle system. In this regard, FIGS. 3a and 3b illustrate a triggering system that is in accordance with the invention that further includes an activated film inventory section 105. The inventory section 105 can have a structure that is similar to the shuttle system described above. Similar to the shuttle system, the inventory device 105 can contain an expandable inventorying section that can be expanded to contain any excess film that is present in the shuttle system of the triggering unit. The inventory section can include guide rolls 107 and an inventory shuttle 120 having inventory shuttle rolls 112. The inventory shuttle is shown as being disposed between, and supported by, guide rails 114. The inventory shuttle typically includes gears 122 that can intermesh with gear teeth 116 that are disposed on the guide rails 114. The guide rails 114 and gears 122 help to maintain the alignment of the inventory shuttle as it travels between varying states of low capacity to high capacity. Like the shuttle frame, the inventory shuttle is repositioned by controlling tension on the film as it travels about the inventory shuttle roll and guide rolls. The inventory shuttle 120 can be repositioned to expand or decrease capacity of the inventory section 105 by increasing or decreasing the speed of the film as it enters or exits the inventory section. In the event of a line stoppage, such as a stoppage or delay that occurs at the packaging system, second driven roll 50 can transfer film from the shuttle system to the inventory section. As a result, film UV exposure can be stopped without having to turn off the UV lamps.

After the activated film 30 has exited the triggering unit it can be sent to a wind-up roll or other suitable storage means for later use, or it can be sent to a packaging system for immediate use.

Although the invention is described in terms of using it in connection with a film, it should be recognized that the term "film" refers to a variety of different flexible materials that can be used in conjunction with the triggering unit including without limitation, laminates, webs, sheets, coatings, and the like. The invention is particularly useful for activating oxygen scavenging compositions that can be used in packaging articles, such as films that can be used as a component in a rigid, semi-rigid, or flexible product; activated films that can be used as a coupon or insert within a package, films that can be included in an oxygen barrier film, or films that have a relatively high oxygen transmission.

The triggering system can be used in the packaging of a wide variety of oxygen sensitive products including smoked and processed meats such as sliced turkey, ham, pepperoni and bologna, vegetable products such as tomato based products, jams and jellies, other food products, such baby foods and other products including electronic components, limited lifetime optical storage media, pharmaceuticals, and the like. The triggering unit is readily adaptable to various vertical form-fill-and-seal (VFFS) and horizontal form-fill-and-seal (HFFS) packaging lines.

A wide variety of oxygen scavenging compositions can be triggered using the invention. Suitable oxygen scavenging compositions are described in U.S. Pat. Nos. 5,211,875, 5,350,622, 5,498,364, and 5,399,289 to Speer et al., and WO 95/04776 and WO 95/02616 to Ching et al., and WO 99/48963 to Cai et al., which are all hereby incorporated by reference in their entirety. Oxygen scavenging compositions for use in the invention typically include an oxidizable organic composition that can be combined with a transition metal catalyst, for example as disclosed in U.S. Pat. No. 5,211,875. Oxygen scavenging compositions include, without limitation, oxidizable organic compositions of substituted or unsubstituted ethylenically unsaturated hydrocarbon polymers. Typical polymers that are useful in the invention have a molecular weight of at least 1000. Particularly useful organic compositions include, but are not limited to styrene/butadiene copolymer, styrene/isoprene copolymer, polybutadiene, polyisoprene, ethylene/methyl acrylate/cyclohexene methyl acrylate, and mixtures thereof. The transition metal catalyst of the oxygen scavenging composition will typically be a transition metal salt of cobalt, manganese, nickel, iron, copper, rhodium, ruthenium, or mixtures thereof.

Additional oxygen scavenging compositions that can be used in the invention are disclosed in U.S. Pat. No. 5,958,254 to Rooney, U.S. Pat. No. 5,859,145 to Ching et al., U.S. Pat. No. 6,255,248 to Bansleben et al., U.S. Pat. No. 6,214,254 to Gauthier et al, U.S. patent application Ser. No. 10/746,626, filed Dec. 24, 2003, and PCT patent publication WO 99/48963, which are all hereby incorporated by reference in their entirety. Other oxygen scavengers which can be used in connection with this invention are disclosed in PCT patent publication WO 94/12590 (Commonwealth Scientific and Industrial Research Organization), incorporated by reference herein in its entirety. These oxygen scavengers include at least one reducible organic composition which is reduced under predetermined conditions, the reduced form of the composition being oxidizable by molecular oxygen, wherein the reduction and/or subsequent oxidation of the organic composition occurs independent of the presence of a transition metal catalyst. The reducible organic composition is preferably a quinone, a photoreducible dye, or a carbonyl composition which has absorbance in the UV spectrum.

The oxygen scavenging compositions can also include photoinitiators, diluents, and additives such as fillers, pigments, dyestuffs, antioxidants, stabilizers, processing aids, plasticizers, fire retardants, anti-fog agents, etc.

The amount of exposure that is needed to trigger the oxygen scavenging composition is dependent upon several variables such as the temperature of the film during and after triggering, film formulation, lamp intensity, film path length, proximity to the UV source, etc. Typically, the oxygen scavenging compositions can be triggered by exposure to UV-C light at a desired wavelength, intensity, and residence time to provide the composition with a dose of UV-C light of at least about 50 $mJ/cm^2$. For example, the composition can receive a dose in excess of 150 $mJ/cm^2$, such as from 300 to 1000 $mJ/cm^2$. In some cases, the UV dose may be as high as 1600 $mJ/cm^2$.

As previously described, the invention includes a dose management system that can be used to control the amount of UV exposure a particular oxygen scavenging composition receives. For instance, when the triggered article is to be used in packages having a headspace, such as modified atmosphere packages (MAP), a faster oxygen scavenging rate, preferably with a very short induction period, is preferred. With such packages, the preferred doses of UV-C light are between 300 and 1600 $mJ/cm^2$, such as between 400 and 800 $mJ/cm^2$. As indicated above, the induction period is the period of time before the scavenging composition exhibits useful scavenging properties. Compositions exhibiting lengthy induction times are typically held by an end user in inventory for a sufficient period of time before use. On the other hand, oxygen scavenging compositions having a shorter induction period are typically used within a relatively short period of time so that the oxygen scavenging properties of the material are not prematurely exhausted.

When the oxygen scavenging film is to be used in active oxygen barrier packaging, the scavenging film provides a function of assisting in preventing the influx of oxygen through the package layers. In an active barrier application, lower oxygen scavenging rates are acceptable and preferred so that the oxygen scavenging film enhances the oxygen barrier nature of the package for longer periods of time. Exemplary active oxygen barrier films that can be used in conjunction with the invention are described in PCT patent publication WO 02/18489 and U.S. Pat. No. 6,599,598 to Kuraray, which are both hereby incorporated by reference in their entirety. Active oxygen barrier films can include one or more layers that provide a physical oxygen barrier and one or more layers that provide active oxygen barrier (scavengers). In some instances, the active oxygen barrier layer may contain a diluent polymer that also provides substantial physical oxygen barrier as well. In some embodiments, the oxygen scavenging formulation may be physically blended into a oxygen barrier layer. For use with barrier packages, especially high barrier long hold packages, the preferred dose of triggering UV-C light is between 50 and 800 mJ/cm$^2$.

It should be apparent from the above discussion that the invention provides a method, apparatus, and system of using the apparatus that can be used to trigger an oxygen scavenging composition at higher speeds than were previously attainable. The invention also provides a triggering unit that can be used to control UV exposure.

vacuum packaged in barrier pouches (P 640B™, Cryovac division of Sealed Air Corp.) having an oxygen transmission rate (OTR) of 5 cc/m$^2$/day). The pouches were inflated with 300 cc of nitrogen atmosphere with about 1% residual oxygen. Samples were then stored at 4-5° C. (refrigerated) for the duration of the test unless indicated otherwise. Portions of the headspace were periodically withdrawn and analyzed for oxygen with a Mocon PAC CHECK™ model 400 or 450 oxygen analyzer.

The average oxygen scavenging rate was calculated by considering only the end points, with the following formula: Average Rate=cc O$_2$ scavenged/(m$^2$·day), and in these examples was calculated 4 days after UV triggering. The peak (instantaneous) rate is the highest scavenging rate observed during any sampling period, and is given by: Δ cc O$_2$ scavenged/(m$^2$·Δday), where Δ is the incremental change between two consecutive measurements. Measurements are typically taken on the day of triggering and after 1, 4, 7, 14, and 21 days after triggering. Rates are further reported as the mean of at least three replicates. The number of days after triggering that the peak instantaneous rate occurs is often frequently noted as an indication of the triggering performance.

TABLE 1

High Speed Triggering Capability - Refrigerated Oxygen Scavenging Rates

| UV Source[a] | Speed (fpm) | Calculated Dose (mJ/cm$^2$) | Induction Period | Average Rate[b] (cc/m$^2$/d) | SD | Ins. Rate* (cc/m$^2$/d) | SD | Peak Day |
|---|---|---|---|---|---|---|---|---|
| All Lamps | 50 | 438 | <1 | 33.6 | 0.9 | 72.0 | 4.0 | 1 |
| All Lamps | 60 | 365 | <1 | 33.3 | 1.0 | 70.4 | 4.8 | 1 |
| All Lamps | 70 | 313 | <1 | 34.0 | 0.3 | 73.7 | 0.3 | 1 |
| All Lamps | 80 | 274 | <1 | 34.3 | 0.8 | 36.2 | 0.8 | 1 |
| All Lamps | 90 | 243 | <1 | 33.6 | 0.4 | 37.8 | 0.6 | 4 |
| All Lamps | 100 | 219 | >1 < 4 | 27.3 | 5.2 | 35.8 | 6.4 | 4 |

[a]Heraeus illuminated path is 100 inches; First Light and UVT path is 58 inches.
[b]Average Rate at 4 days
*instantaneous rate

EXAMPLES

The following examples are provided for the purpose of illustration and should not be considered as limiting the invention in any way.

Example 1

Table 1 illustrates that the triggering unit can be used to activate oxygen scavenging compositions at high rates of speed. In example 1, a film having an oxygen scavenging composition was triggered with a triggering unit that is in accordance with the invention. The triggering unit included four lamp banks having three types of mercury amalgam lamps from three different manufactures. An internal temperature set point of 60° C. was used for the film zone within the unit. The data in Table 1 shows that the triggering unit has excellent triggering capabilities and can trigger films at speeds in excess of 80 fpm. The induction period is the amount of time between exposing the composition to a radiation source and when the scavenging properties of the composition actually begin. An induction period of less than one day is generally preferred for headspace scavenging applications. As is evident from Table 1, the triggering unit had acceptable induction rates for film speeds in excess of 90 fpm.

To determine the oxygen scavenging rate of the films, irradiated films of well-defined area (usually 200 cm$^2$) were The triggering unit included four lamp banks. Two of the lamp banks were equipped with NNI 82/62 mercury amalgam lamps (12 each) available from Heraeus Noblelight, which is located in Hanau, Germany. A third lamp bank contained mercury amalgam lamps (12 each) available from First Light Technologies, which is located in Poultney, Vt. The final lamp bank contained eleven UVI 200 U mercury amalgam lamps available from UV-Technik Speciallampen, which is located in Wümbach, Germany. The path of the film in proximity to the lamps was about 5.5 m. A triggering unit of the invention can have any suitable number of lamp banks, such as 1 to 4 lamp banks. In a triggering unit of the invention, each lamp bank can have any suitable number of lamps, such as from 10 to 12 UV lamps.

Film Examples

The film examples hereunder utilized the following materials:

| Material Code | Tradename Or Designation | Source(s) |
|---|---|---|
| AB1 | 10853 | Ampacet |
| AD1 | PLEXAR PX 107A ™ | Equistar |

-continued

| Material Code | Tradename Or Designation | Source(s) |
|---|---|---|
| NY1 | ULTRAMID ™ B 35 NATURAL | BASF |
| NY2 | GRIVORY ™ G21 | EMS |
| OB1 | SOARNOL ™ ET | Nippon Gohsei |
| OS1 | OSP500R ™ | Chevron Phillips |
| OSM1 | OSP100M ™ | Chevron Phillips |
| MB1 | — | Cryovac Inc. |
| PE01 | AFFINITY ™ PL 1850 | Dow |
| PE02 | PE1042CS15 ™ | Huntsman |
| PET1 | HOSTAPHAN 2DEF/2DEFN ™ | Mitsubishi |
| SX1 | MB50-313 ™ | Dow Corning |

AB1 is an antiblock masterbatch in LLDPE containing 19% diatomaceous earth.

AD1 is an anhydride grafted ethylene/vinyl acetate copolymer (EVA), with 10% vinyl acetate monomer, and a melt index of 3.2, used as an adhesive or tie layer during coextrusion.

EV1 is ethylene/vinyl acetate copolymer with a vinyl acetate content of 9%.

NY1 is nylon 6 (polycaprolactam).

NY2 is an amorphous copolyamide (6I/6T) derived from hexamethylene diamine, isophthalic acid, and terephthalic acid.

OB1 is an ethylene/vinyl alcohol copolymer with 38 mole percent ethylene.

OS1 is an oxygen scavenger resin, polyethylene/methyl acrylate/cyclohexene methyl acrylate).

OSM1 is a masterbatch from Chevron Phillips produced from a carrier resin (ethylene/methyl acrylate copolymer), having 1%, by weight of the masterbatch, of cobalt metal present as cobalt oleate, and 1%, by weight of the masterbatch, of tribenzoyl triphenyl benzene.

MB1 is a masterbatch containing 1% isopropylthioxanthone, 9% ethylene/methyl acrylate copolymer in a base of OS1.

PE01 is a single site catalyzed ethylene/1-octene copolymer with a density of 0.902 grams/cc, a melt index of 3.0, and an octene-1 comonomer content of 12%.

PE02 is a low density polyethylene resin with a density of 0.922 grams/cc and a melt index of 2.0.

PET1 is a chemically primed polyethylene terephthalate film.

SX1 is an ultra-high molecular weight polysiloxane masterbatch in an LLDPE carrier resin with a density of 0.94 grams/cc.

The film structure of example 1 is a high-slip barrier laminate. The barrier sealant portion is adhesively laminated to PET.

Example 2

In example 2, a film having a reformulated oxygen scavenging composition was triggered with a triggering unit that is in accordance with the invention. The triggering unit included four lamp banks having three types of mercury amalgam lamps from three different manufactures. In this test, the two banks of Heraeus lamps were used to trigger the film and separately, the one bank of UV Technik (UVT) lamps was used. An internal temperature set point of 60° C. was used for the film zone within the unit. The film structure was:

| Sealant | OS | Tie | Nylon | EVOH | Nylon | Tie | Bulk | Bulk | PET |
|---|---|---|---|---|---|---|---|---|---|
| 88% PE01 8% AB1 4% SX1 | 85% OS1 10% OSM1 5% MB1 | AD1 | NY1/NY2 (80/20) | OB1 | NY1/NY2 (80/20) | AD1 | PE02 | PE02 | PET1 |
| 0.25 mil | 0.75 mil | 0.18 mil | 0.18 mil | 0.25 mil | 0.19 mil | 0.20 mil | 0.25 mil | 0.25 mil | 0.48 mil |

Oxygen scavenging data was collected as described above.

TABLE 3

High Speed Triggering Capability - Refrigerated Oxygen Scavenging Rates

| UV Lamp[a] | Speed | Calculated Dose MJ/cm$^2$ | Induction Period | Average Rate[b] (cc/m$^2$/d) | SD | Ins. Rate (cc/m$^2$/d) | SD | Peak Day |
|---|---|---|---|---|---|---|---|---|
| Heraeus | 40 fpm | 246 | <1 | 34.0 | 0.8 | 68.5 | 2.5 | 1 |
| Heraeus | 60 fpm | 185 | <1 | 33.4 | 0.7 | 38.8 | 2.2 | 4 |
| Heraeus | 80 fpm | 123 | >1 <7 | 0 | — | 48.8 | 0.5 | 7 |
| UVT | 20 fpm | 287 | <1 | 34.4 | 0.3 | 67.1 | 0.8 | 1 |
| UVT | 30 fpm | 216 | <1 | 34.0 | 0.7 | 36.5 | 1.6 | 4 |
| UVT | 40 fpm | 144 | >1 <4 | 2.1 | 0.3 | 44.9 | 0.4 | 7 |

[a]Heraeus illuminated path is 100 inches; and UVT path is 58 inches.
[b]Average Rate at 4 days The data in Table 3 shows that the triggering unit has excellent triggering capabilities with the reformulated film and as few as 24 lamps can trigger OS Film well at speeds of about 60 fpm. As few as 11 lamps can trigger OS Film well at 30 fpm. It should be noted that the scavenging performance seen at 80 fpm with the Heraeus lamps and 40 fpm with the UVT lamps is useful for some applications. At those triggering speeds, significantly greater scavenging rates would be obtained in a room temperature application.

Example 3

In example 3, a film having a reformulated oxygen scavenging composition was triggered with a triggering unit that is in accordance with the invention. The triggering unit included four lamp banks having three types of mercury amalgam lamps from three different manufactures. In this test, the two banks of Heraeus lamps were used to trigger the film. An internal temperature set point of 60° C. was used for the film zone within the unit. The film structure was:

| Sealant | OS | Tie | Nylon | EVOH | Nylon | Tie | Bulk | Bulk | PET |
|---|---|---|---|---|---|---|---|---|---|
| 88% PE01 8% AB1 4% SX1 | 87.5% OS1 10% OSM1 2.5% MB1 | AD1 | NY1/NY2 (80/20) | OB1 | NY1/NY2 (80/20) | AD1 | PE02 | PE02 | PET1 |
| 0.25 mil | 0.75 mil | 0.18 mil | 0.18 mil | 0.25 mil | 0.19 mil | 0.20 mil | 0.25 mil | 0.25 mil | 0.48 mil |

Oxygen scavenging data was collected as described above, except that the samples were held at room temperature.

TABLE 4

High Speed Triggering Capability - Room Temperature Oxygen Scavenging Rates

| UV Lamp[a] | Speed | Calculated Dose MJ/cm$^2$ | Induction Period | Average Rate[b] (cc/m$^2$/d) | SD | Ins. Rate (cc/m$^2$/d) | SD | Peak Day |
|---|---|---|---|---|---|---|---|---|
| Heraeus | 50 fpm | 197 | <1 | 49.5 | 0.9 | 113.0 | 2.2 | 1 |
| Heraeus | 100 fpm | 98.5 | >1 < 7 | 0 | — | 22.2 | 2.2 | 7 |

[a]Heraeus illuminated path is 100 inches.
[b]Average Rate at 4 days

The data in Table 4 shows that the triggering unit provided beneficial triggering capabilities with the reformulated film and as few as 24 lamps can trigger oxygen scavenging films well at speeds of about 50 fpm. It should be noted that the scavenging performance seen at 100 fpm with the Heraeus lamps is useful for some applications, for example, those primarily requiring an active oxygen barrier rather than rapid headspace scavenging.

Example 4

A multilayered active oxygen barrier film is made by coextrusion with one or more physical oxygen barrier layers such as nylon and/or EVOH and at least one oxygen scavenging layer. One or more active oxygen scavenging layers is formulated with an oxidizable polymer, an optional diluent polymer, one or more photoinitiators, and a cobalt carboxylate catalyst. The apparatus of the current invention is used to provide a dose of UV of at least about 50 mJ/cm$^2$ at a film temperature of greater than about 50° C. The film is used in room temperature or elevated temperature applications such as hot fill, cook-in and retort. The active oxygen barrier film has an oxygen transmission rate (after triggering) that is at least 50% lower than the same structure without the oxygen scavenging layer(s). The resulting active oxygen barrier film has an overall oxygen transmission rate of less than 0.5 cc/m$^2$·day·atm. (measured at 25° C.) for at least 2 days.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A triggering unit for activating a film having an oxygen scavenging composition, said triggering unit comprising
a UV light source having a proximal end and a distal end; and
a UV dose management system adapted to control the amount of UV light to which said film is exposed, the UV dose management system comprising a plurality of stationary guide rolls positioned towards the distal end of the UV light source and a plurality moveable shuttle rolls, the guide rolls and shuttle rolls cooperating to define a film path that is capable of being in close proximity to said UV light source, wherein said shuttle rolls are configured and arranged to travel between the distal and proximal ends of the UV light source so that exposure of the film to UV light is controllable by shortening or lengthening of the film path between said shuttle and guide rolls.

2. A triggering unit according to claim 1, further comprising an air circulation system for maintaining the temperature of the film from about 35 to 75° C.

3. A triggering unit according to claim 2, wherein the air circulation system comprises
- a fan for removing heated air from said triggering unit;
- a heat exchanger for removing heat from said air; and
- a plenum for passing the thus cooled air over the film as it moves through said triggering unit.

4. A triggering unit according to claim 1, further comprising a lamp cooling system having
- a fan for removing heated air from said triggering unit;
- a heat exchanger for removing heat from said air; and
- a plenum for passing the thus cooled air in contact with said UV lamps.

5. The triggering unit according to claim 1, wherein said UV light source comprises a lamp cassette comprising a first panel, a second panel, and a plurality of UV lamps disposed between said first and second panels, said first and second panels each having an opening through which UV light is transmittable.

6. The triggering unit according to claim 5, wherein said UV lamps are mercury amalgam lamps.

7. The triggering unit according to claim 5, further including a moveable front and second back shade for limiting the amount of UV light that is transmitted through said openings, said shades adapted to move between an open position and closed position whereby UV light transmittance through said openings can be controlled.

8. The triggering unit according to claim 1, further comprising a first driven roll and second driven roll that define a path for directing said film into close proximity with said UV lamp source, said first and second driven rolls being configured and arranged to maintain the film at a desired level of tension.

9. The triggering unit according to claim 1, further comprising a moveable frame on which the plurality of shuttle rolls are disposed, the frame being configured and arranged to travel between the distal and proximal ends of the UV light source.

10. The triggering unit according to claim 9, further comprising a plurality of pistons or cylinders that are configured to moveably support said moveable frame.

11. A triggering unit for activating a film having an oxygen scavenging composition, said unit comprising:
- a first driven roll and a second driven roll for driving said film through said triggering unit;
- a plurality of substantially parallel UV lamps disposed between said first and second driven rolls, the plurality of UV lamps defining at least one lamp bank having a proximal end and a distal end;
- a plurality of guide rolls disposed adjacent to the proximal end of the at least one lamp bank; and
- a moveable shuttle system having a plurality of shuttle rolls, the guide rolls and shuttle rolls cooperating to define a film path that is capable of being in close proximity to said at least one lamp bank, wherein said moveable shuttle system is adapted to travel between the distal and proximal ends of the at least one UV lamp bank so that exposure of the film to UV light is controllable by shortening or lengthening of the film path between said shuttle and guide rolls.

12. A triggering unit according to claim 11, wherein the UV lamps are mercury amalgam lamps.

13. A triggering unit according to claim 11, wherein the triggering unit includes at least 4 UV lamp banks.

14. A triggering unit according to claim 11, wherein the lamp bank is a lamp cassette having a first panel and a second panel and a plurality of UV lamps disposed between said first and second panels, said first and second panels each having an opening through which UV light is transmittable.

15. A triggering unit according to claim 11, further comprising an air circulation system for maintaining the temperature of the film at from about 35 to 75° C.

16. A triggering unit according to claim 11, wherein said shuttle system includes a shuttle frame for supporting said shuttle rolls, and wherein said shuttle rolls are disposed on said shuttle frame.

17. A method for triggering a film having an oxygen scavenging composition comprising:
- introducing a film having an oxygen scavenging composition into a UV triggering chamber, said UV triggering chamber comprising:
  - a UV light source having a proximal end and a distal end; and
  - a UV dose management system adapted to control the amount of UV light to which said film is exposed, the UV dose management system comprising a plurality of stationary guide rolls positioned towards the distal end of the UV light source and a plurality moveable shuttle rolls, the guide rolls and shuttle rolls cooperating to define a film path that is capable of being in close proximity to said UV light source, wherein said shuttle rolls are configured and arranged to travel between the distal and proximal ends of the UV light source so that exposure of the film to UV light is controllable by shortening or lengthening of the film path between said shuttle and guide rolls; and
- exposing said film to the UV light source by traveling the film through said film path for a time sufficient to provide the oxygen scavenging composition with a dose of UV radiation to activate the oxygen scavenging composition.

18. The method of claim 17, further comprising the step of adjusting the level of tension that is applied to said film by applying a downward pressure on said film as it passes through said chamber.

19. The method for triggering a film according to claim 17, further comprising the step of heating the film to a temperature that is from about 35 to 75° C.

* * * * *